United States Patent [19]

Dulhunty

[11] 4,360,177

[45] Nov. 23, 1982

[54] SUSPENSION CLAMP

[75] Inventor: Philip W. Dulhunty, Greenwich, Australia

[73] Assignee: Dulmison (Australia) Pty. Limited, Australia

[21] Appl. No.: 218,581

[22] Filed: Dec. 19, 1980

[30] Foreign Application Priority Data

Jan. 8, 1980 [AU] Australia .................... PE1937

[51] Int. Cl.³ .............................................. F16L 3/00
[52] U.S. Cl. .................................. 248/63; 24/131 C; 24/135 R; 174/40 R; 248/58; 403/365
[58] Field of Search .................. 248/58, 61, 63, 74 B; 403/368, 365, 344; 24/135 R, 135 A, 135 K, 131 C, 131 R, 115 R; 174/40 R, 42

[56] References Cited

U.S. PATENT DOCUMENTS

| | | | |
|---|---|---|---|
| 1,997,143 | 4/1935 | Hawley | 248/63 |
| 3,219,298 | 11/1965 | Ruhlman | 248/63 |
| 3,463,870 | 8/1969 | Eucker | 174/42 |
| 3,775,811 | 12/1973 | Smrekar et al. | 24/131 C X |

Primary Examiner—William H. Schultz
Assistant Examiner—Ramon O. Ramirez
Attorney, Agent, or Firm—Beveridge, DeGrandi & Kline

[57] ABSTRACT

A suspension clamp for an electrical conductor or other filamentary member comprising an open-sided housing able to be presented transversely to a conductor to extend at least partially around it, said housing being adapted for securement to a support, a conductor engaging cradle supported by said housing provided with axially extending walls spaced inwardly from said housing, said housing and cradle being able to accept a plurality of helical conductor clamping rods between said housing and said cradle for surrounding and providing clamping force between said conductor and said cradle thereby to secure said conductor to said clamp.

36 Claims, 7 Drawing Figures

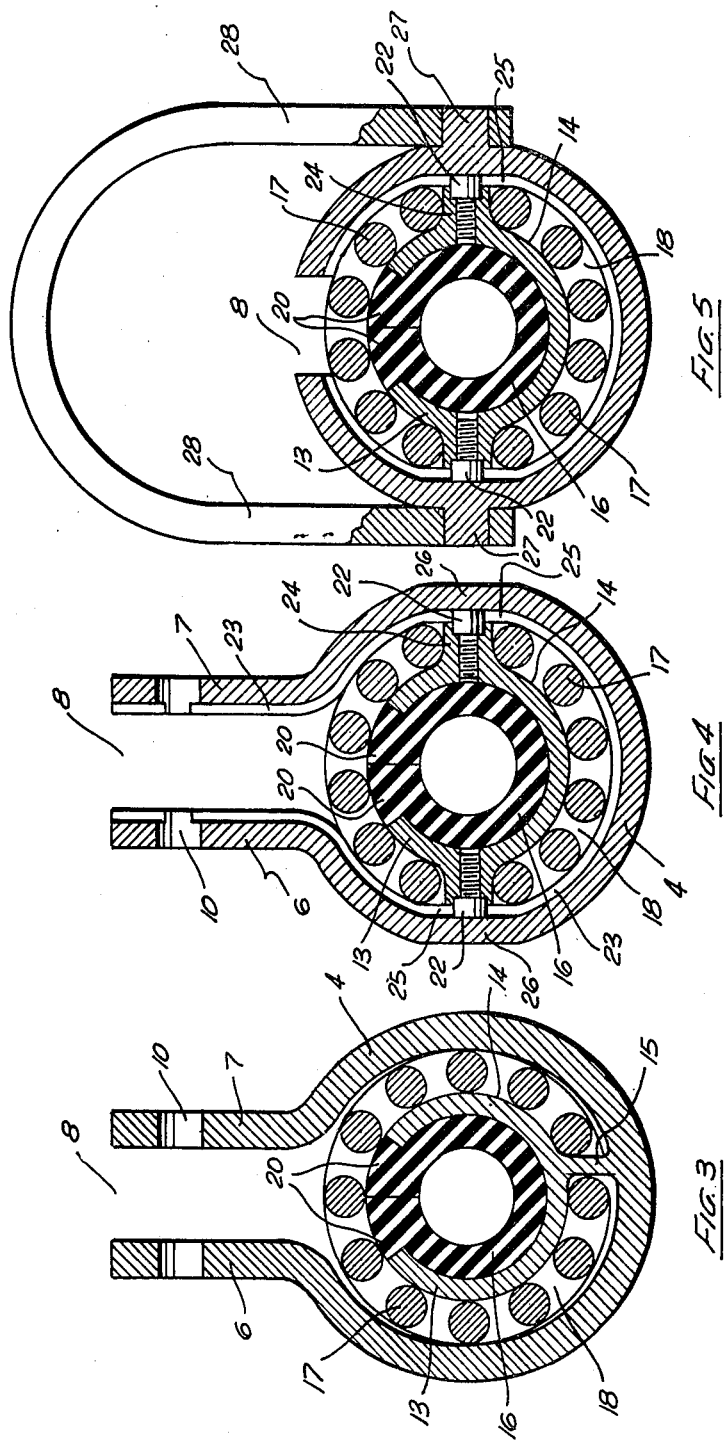

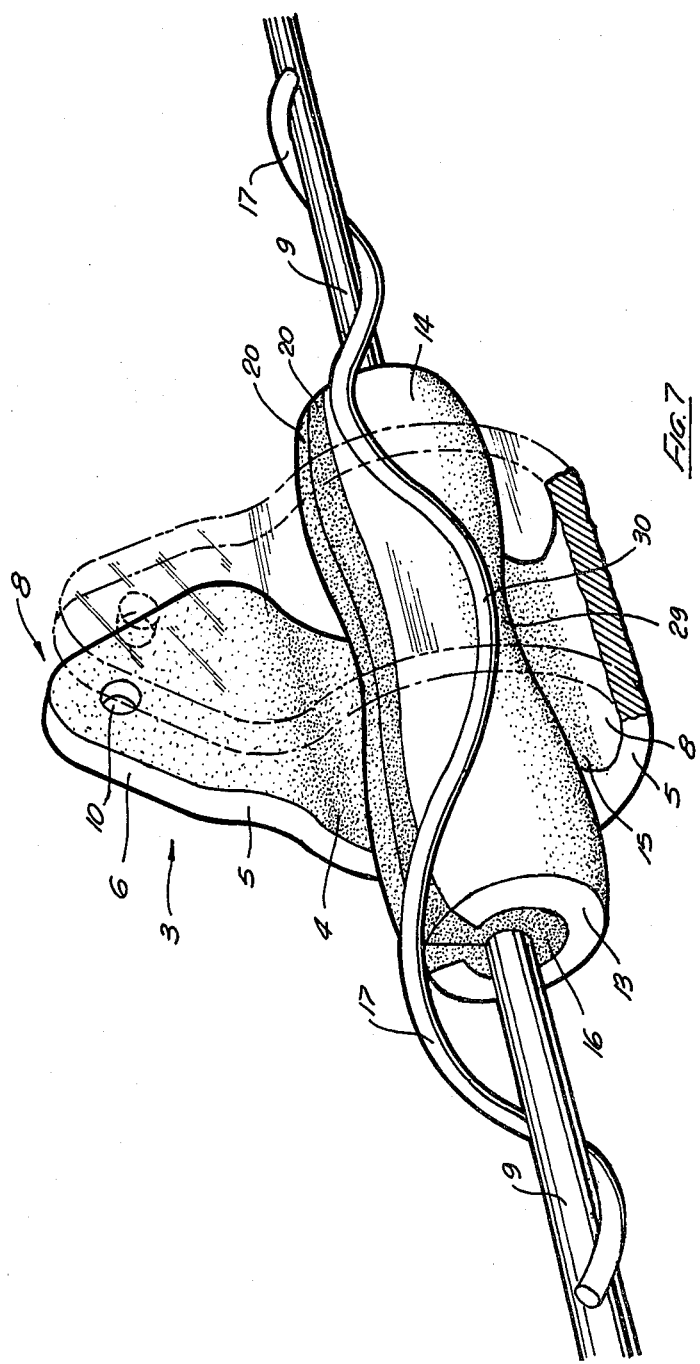

SUSPENSION CLAMP

The present invention relates to suspension clamps for transmission line cables or any other installations where it is necessary to suspend a filamentary member such as a cable or rod.

The invention has particular relevance to overhead transmission line conductors and will be described hereinafter with reference to this particular use. It will be appreciated, however, that the invention is not limited to this particular application.

Transmission line conductors are traditionally supported by poles or towers to which they are attached by any one of numerous types of insulator. The insulator generally supports a downwardly extending holed flange or eyelet for engagement with the suspension clamp. Since it is impractical if not impossible to thread closed clamping elements over the cable, existing clamps have generally been arranged in two or more complementary sections which can be presented and secured to the conductor at a point intermediate its ends. Such devices are generally complex, being difficult to manufacture and use.

The present invention has been developed to provide a relatively simple suspension clamp which can be firmly and easily secured to the cable at any desired point along its length.

It is further object of preferred embodiments of the invention to provide a clamp which will safely release the cable longitudinally at a preselected loading.

According to the invention there is provided a suspension clamp for an electrical conductor or other filamentary member comprising an open-sided housing able to be presented transversely to a conductor to extend at least partially around it, said housing being adapted for securement to a support, a conductor engaging cradle supported by said housing provided with axially extending walls spaced inwardly from said housing, said housing and cradle being able to accept a plurality of helical conductor clamping rods between said housing and said cradle for surrounding and providing clamping force between said conductor and said cradle thereby to secure said conductor to said clamp.

Preferred embodiments of the invention will now be described by way of example only, with reference to the accompanying drawings, in which:

FIG. 3 is a transverse section through a second clamp according to the invention;

FIG. 4 is a transverse section through a third clamp according to the invention;

FIG. 5 is a transverse section through a fourth clamp according to the invention;

FIG. 7 is a perspective view of a fifth clamp according to the invention. Again, only a single clamping rod has been illustrated for reasons of clarity.

Figure 1:
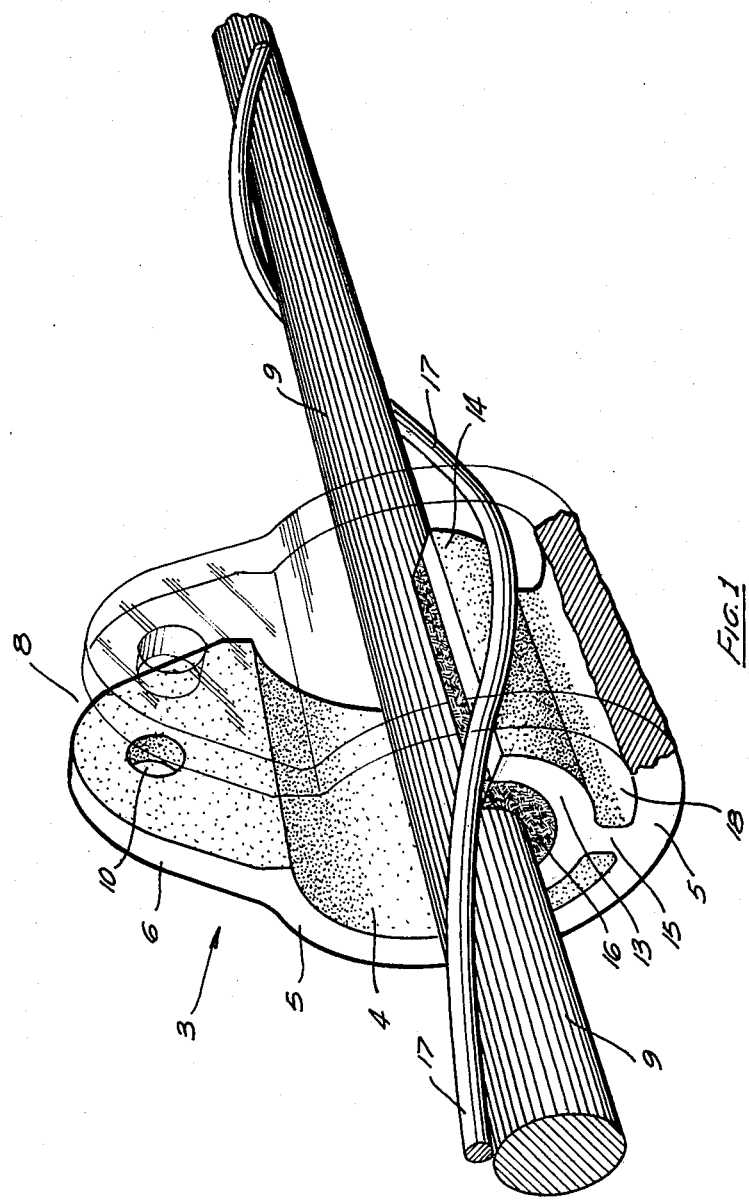
FIG. 1 is a perspective view of a first type of suspension clamp according to the invention, secured to a conductor. For clarity, only one clamping rod has been illustrated.
Figure 2:
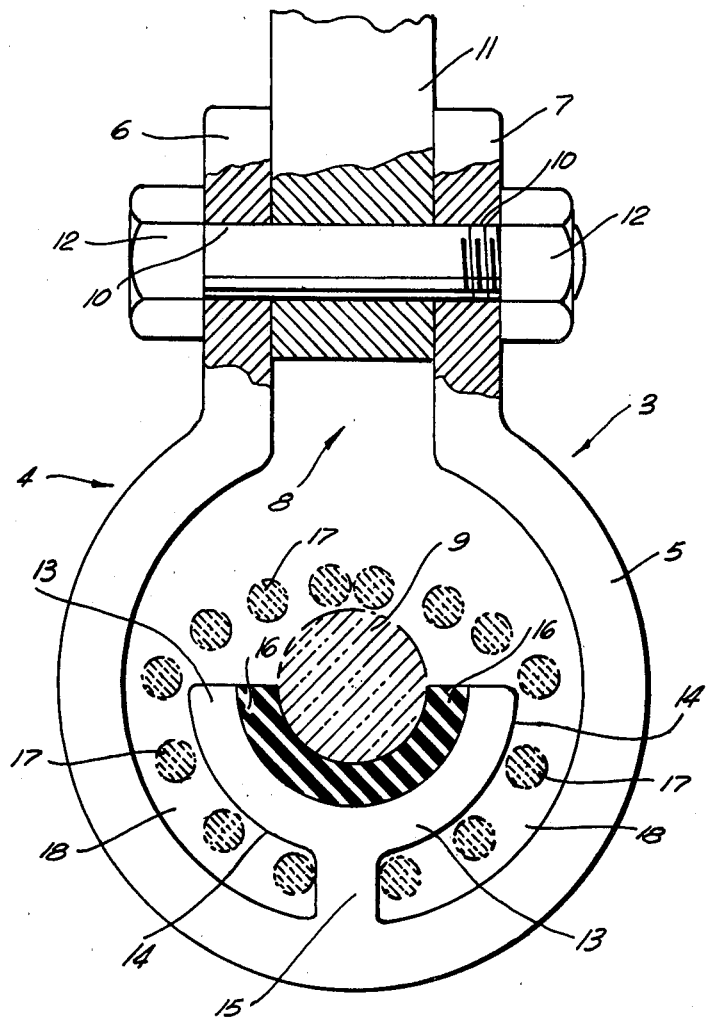
FIG. 2 is a transverse section through the clamp shown in FIG. 1.

Referring to FIGS. 1 and 2 of the drawings, the suspension clamp 3 comprises a generally circular C-shaped housing 4 having a circumferential wall 5 ending in two spaced flanges 6 and 7. The spaced flanges define an opening 8 by which the clamp can be presented transversely to a conductor 9 so as to extend at least partly around it. The conductor may be of single or multi-strand form. The spaced flanges 6 and 7 are provided with aligned holes 10 for securing the clamp to a support 11 by means of a bolt 12 or other suitable means.

The housing 4 includes a conductor engaging cradle 13 which, in this first embodiment, is substantially U-shaped in section and provided with longitudinally extending walls 14 spaced inwardly from the housing and fixedly mounted therein by a longitudinally extending web 15. When the housing is in its operative position, the conductor 9 rests in the cradle 13. The housing and cradle in this instance are integrally formed from an alluminium alloy and a resilient elastomeric cushioning element 16 is preferably positioned between the conductor and the cradle.

The housing and cradle are able to accept a plurality of helical conductor clamping rods 17 in the annular space 18 between the circumferential housing wall 5 and the cradle wall 14. The clamping rods 17, commonly called "armour rods", are preformed with an inside rest diameter less than that of the conductor. With the conductor resting on the cradle or the cushioning element, the rods can be inserted into the annular space 18 so as to surround the conductor and cradle and resiliently apply clamping force between them in order to secure the conductor to the clamp. For clarity, only one armour rod is illustrated in FIG. 1.

The integral web 15 may be parallel to the longitudinal axis of the conductor as shown, or it may be curved or at any desired angle to the longitudinal axis to assist in the attachment and securement of the preformed helical clamping rods. The web may also be of predetermined cross-sectional area so as to be able to fracture or shear at a preselected loading and provide for slippage of the conductor relative to the support at a predetermined longitudinal load. This safety feature is intended to prevent cascade or "domino" failures where a sudden increase in conductor tension (caused, for example, by an aircraft striking one cable span) might otherwise damage a series of support towers in domino fashion.

A second clamp according to the invention is illustrated in FIG. 3 of the drawings where corresponding components have been provided with corresponding reference numerals, as is the case throughout the drawings. In this embodiment, however, the cradle is generally C-shaped rather than U-shaped to provide an over-centre locking action in combination with the keyed resilient sleeve element 16, which is longitudinally split and provided at its circumferentially opposite ends with abutting, radially extending locking flanges 20. Once the resilient element has been placed over the conductor transversely by means of its axial split, it can then be slid longitudinally into transverse, locking engagement with the over-centred cradle 13. The armour rods are then applied as described above. For clarity, however, the conductor has not been illustrated in FIGS. 3 to 6, nor have the armour rods been included in the sectional side-elevation of FIG. 6.

Figure 6:
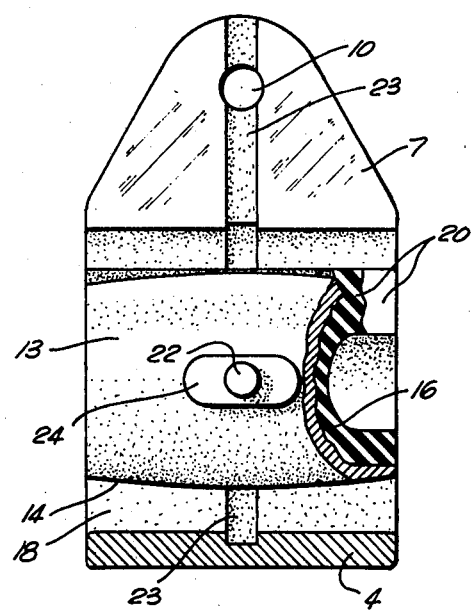
FIG. 6 is a partly sectioned side elevation of the clamp shown in FIG. 4.

FIGS. 4 and 6 illustrate a third embodiment in which the web 15 is replaced by a pair of aligned, transversely extending pins 22 which upon presentation of the housing and rotation into position, engage with a circumferentially extending slot 23 formed around the inside wall of the housing 4. The housing 4 may be of cast aluminium alloy or formed from a flat bar, the slot being cut before bending the housing in this latter case. The slot may also be formed by building up a pair of adjacent side walls above the inner surface of the housing.

Spacers 24 are preferably provided to ensure shear failure of the pins and thereby prevent jamming of bent pins. The spacers may be in the form of integral bosses as shown or separate washer-like elements placed over or beneath the pins 22. In the illustrated embodiment, the pins are threaded to the cradle but they may be secured by any suitable method.

Also in this embodiment, the slot 23 preferably defines a pair of parallel guideways 25 over part of its length to allow the cradle and armour rods limited vertical movement by the pins moving along the guideways, thereby freeing the pins from vertical loading components which are resisted by the cradle and armour rods resting in load bearing contact with the floor of the housing. Preferably, the housing wall is of constant thickness and provided with oppositely directed flattened portions 26 defining the guideways 25. The flattened portions 26 are of such a length as to allow the cradle 13 to enter the housing 14 longitudinally while displaced 90° from the orientation shown. Relative rotation through 90° then allows the pins 22 to engage the slot 23.

The strength of the pins 22 may be selected so as to provide a predetermined shearing load to release the cable if a specified longitudinal loading is exceeded.

In a fourth embodiment illustrated in FIG. 5, the housing is generally C-shaped and trunnion mounted by means of oppositely directed pins 27 extending outwardly from the housing and engaging a trunnion yoke support 28 or other suitable means. The cradle 13 may take any of the forms described or illustrated above.

It will be appreciated that with the armour rods in position supporting the conductor, the clamps illustrated in FIGS. 4, 5 and 6 support vertical tensile loadings through the housing via the cradle and armour rods. The shear pins act only against longitudinal loadings, that is, loadings parallel to the axis of the housing and conductor, and can be designed to shear safely at a predetermined load.

In the second embodiment illustrated in FIG. 3, the web can be constructed to withstand the maximum slip strength of the conductor since the assembly should be such that the conductor will not slip through the armour rod and cradle assembly. However, in the third embodiment illustrated in FIG. 4, predetermined shear pin failure will provide controlled release of the cradle and armour rod assembly out of the housing, enabling the conductor to move longitudinally and relieve tensile stresses on the tower or pole attachments, whilst at the same time, the housing will prevent the conductor falling to the ground.

Furthermore, by using the cradle and elastomeric element illustrated in FIGS. 4, 5 and 6, the cradle and its associated element can be secured to the conductor initially and the armour rods applied without the interference of the housing which is subsequently applied over the conductor and slid along the rods and subsequently rotated into engagement with the cradle by means of the slot and shear pin arrangement.

FIG. 7 illustrates a fifth clamp according to the invention in which the cradle has a waisted centre portion 29 of reduced diameter as shown. The cradle also extends longitudinally beyond the housing for added support and is intended for use with armour rods arranged as shown such that substantially an entire pitch lies along one side of the cradle. For clarity, only one armour rod 17 has been shown in FIG. 7 but with all the adjacent rods in position, closely gripping the external wall 14 of the cradle, the arrangement provides a very strong grip with the central portions 30 of each armour rod 17 extending inwardly into the waisted centre portion 29 of the cradle thereby to provide an additional locking action against longitudinal movement of the cradle relative to the rods.

In this embodiment, the elastomeric element 16 has the same cross-sectional shape as previously illustrated but the outer surfaces of its flanges 20 are shaped to conform with the waisted shape of the cradle.

The cradle and elastomeric element of any of the embodiments described above may also extend longitudinally beyond the housing if required, as shown in FIG. 7. Similarly, the elastomeric element itself may extend longitudinally beyond the cradle.

Although the invention has been described with reference to specific examples, it will be appreciated by those skilled in the art that the invention may be embodied in many other forms.

I claim:

1. A suspension clamp for an electrical conductor or other filamentary member comprising an open-sided housing adapted to be presented transversely to a conductor to extend at least partially around it, said housing being adapted for securement to a support, a conductor-engaging cradle having a substantially U-shaped transverse cross-section, a web fixedly securing said cradle to said housing, said cradle provided with axially extending walls spaced inwardly from said housing, said housing and cradle being adapted to accept a plurality of helical conductor clamping rods between said housing and said cradle for surrounding and providing clamping force between a conductor and said cradle thereby to secure the conductor to said clamp.

2. A suspension clamp according to claim 1 wherein said web extends beneath said cradle and at an angle to the longitudinal axis of the conductor.

3. A suspension clamp according to claim 1 including a resilient cushioning element for engagement between the conductor and said cradle.

4. A suspension clamp according to claim 1 wherein said housing is provided with flanges defining said open side, said flanges being adapted for securement to said support.

5. A suspension clamp according to claim 1 wherein said cradle extends longitudinally beyond said housing.

6. A suspension clamp according to claim 1 wherein said cradle has a waisted centre portion of reduced diameter.

7. A suspension clamp according to claim 3 wherein said cushioning element extends longitudinally beyond said cradle.

8. A suspension clamp for an electrical conductor or other filamentary member comprising an open-sided housing adapted to be presented transversely to a conductor to extend at least partially around it, said housing being adapted for securement to a support; a conductor-engaging cradle having a substantially C-shaped transverse cross-section, supported by said housing, and provided with axially extending walls spaced inwardly from said housing; said housing and cradle being adapted to accept a plurality of helical conductor clamping rods between said housing and said cradle for surrounding and providing clamping force between a conductor and said cradle thereby to secure the conductor to said clamp.

9. A suspension clamp according to claim 8 further comprising a web fixedly securing said cradle to said housing.

10. A suspension clamp according to claim 9 wherein said web extends beneath said cradle and at an angle to the longitudinal axis of the conductor.

11. A suspension clamp according to claim 8 including a resilient cushioning element for engagement between the conductor and said cradle, said cushioning element being longitudinally split for transverse sleeving engagement with the conductor and provided at its circumferentially opposite ends with locking flanges for transverse locking engagement with said cradle upon being slid longitudinally into engagement with said cradle sleeved over the conductor.

12. A suspension clamp according to claim 11 wherein said cradle is releasably attached to said housing.

13. A suspension clamp according to claim 12 wherein said housing is provided with a circumferentially extending slot and said cradle is provided with a pair of aligned, transversely extending pins engageable with said slot.

14. A suspension clamp according to claim 8 wherein said cradle is releasably attached to said housing.

15. A suspension clamp according to claim 14 wherein said housing is provided with a circumferentially extending slot and said cradle is provided with a pair of aligned, transversely extending pins engageable with said slot.

16. A suspension clamp according to claim 13 or 15 wherein said slot defines a pair of parallel guideways over part of its length, said pins being respectively movable along said guideways to allow said cradle limited transverse movement in a direction parallel to said guideways thereby freeing said pins from loading components in said direction by permitting said cradle and clamping rods to rest in load bearing contact with said housing.

17. A suspension clamp according to claim 16 wherein said housing is provided with oppositely directed flattened wall portions defining said guideways.

18. A suspension clamp according to claim 12 or 13 wherein two spacers are provided on said cradle respectively positioned adjacent each of said pins.

19. A suspension clamp according to claim 18 wherein said spacers are integral bosses formed on said cradle.

20. A suspension clamp according to claim 13 or 15 wherein said pins are threadedly engaged with said cradle.

21. A suspension clamp according to claim 8 wherein said housing is provided with oppositely directed outwardly extending aligned pins for engagement with a trunnion support.

22. A suspension clamp according to claim 17 in which said housing is generally C-shaped in end view.

23. A suspension clamp for an electrical conductor or other filamentary member comprising an open-sided housing adapted to be presented transversely to a conductor to extend at least partially around it, said housing being adapted for securement to a support and having a circumferentially extending slot; a conductor-engaging cradle supported by said housing provided with axially extending walls spaced inwardly from said housing and a pair of aligned, transversely extending pins engageable with said slot; said housing and cradle being adapted to accept a plurality of helical conductor clamping rods between said housing and said cradle for surrounding and providing clamping force between a conductor and said cradle thereby to secure the conductor to said clamp.

24. A suspension clamp according to claim 23 wherein said housing is provided with oppositely directed outwardly extending aligned pins for engagement with a trunnion support.

25. A suspension clamp for an electrical conductor or other filamentary member comprising an open-sided housing adapted to be presented transversely to a conductor to extend at least partially around it, said housing having flanges defining said open side and adapted for securement to a support, a conductor engaging cradle supported by said housing and provided with axially extending walls spaced inwardly from said housing, said housing and cradle being able to accept a plurality of helical conductor clamping rods between said housing and said cradle for surrounding and providing clamping force between said conductor and said cradle thereby to secure said conductor to said clamp.

26. A suspension clamp according to claim 8, 23, or 25 including a resilient cushioning element for engagement between said conductor and said cradle.

27. A suspension clamp according to claim 26 wherein said cushioning element extends longitudinally beyond said cradle.

28. A suspension clamp according to claim 23 or 25 including a resilient cushioning element for engagement between said conductor and said cradle, said cushioning element being lontitudinally split for transverse sleeving engagement with said conductor and provided at its circumferentially opposite ends with locking flanges for transverse locking engagement with said cradle upon being slid longitudinally into engagement with said cradle sleeved over said conductor.

29. A suspension clamp according to claim 25 wherein said housing is provided with a circumferentially extending slot and said cradle is provided with a pair of aligned, transversely extending pins engageable with said slot.

30. A suspension clamp according to claim 23 or 29 wherein said slot defines a pair of parallel guideways over part of its length, said pins being respectively movable along said guideways to allow said cradle limited transverse movement in a direction parallel to said guideways thereby freeing said pins from loading components in said direction by permitting said cradle and clamping rods to rest in load bearing contact with said housing.

31. A suspension clamp according to claim 30 wherein said housing is provided with oppositely directed flattened wall portions defining said guideways.

32. A suspension clamp according to claim 23 or 29 further including two spacers on said cradle and respectively positioned adjacent each of said pins.

33. A suspension clamp according to claim 32 wherein said spacers are integral bosses formed on said cradle.

34. A suspension clamp according to claim 23 or 29 wherein said pins are threadedly engaged with said cradle.

35. A suspension clamp according to claim 23 or 25 wherein said cradle extends longitudinally beyond said housing.

36. A suspension clamp according to claim 23 or 25 wherein said cradle has a waisted center portion of reduced diameter.

* * * * *